United States Patent
Longobardi

(10) Patent No.: US 8,271,983 B2
(45) Date of Patent: *Sep. 18, 2012

(54) WORKLOAD SCHEDULER WITH CUMULATIVE WEIGHTING INDEXES

(75) Inventor: Giuseppe Longobardi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1111 days.

This patent is subject to a terminal disclaimer.

(21) Appl. No.: 12/167,738

(22) Filed: Jul. 3, 2008

(65) Prior Publication Data

US 2008/0313643 A1  Dec. 18, 2008

Related U.S. Application Data

(63) Continuation of application No. 10/876,026, filed on Jun. 24, 2004, now Pat. No. 7,441,244.

(30) Foreign Application Priority Data

Dec. 10, 2003  (EP) .................................. 03368112

(51) Int. Cl.
*G06F 9/46* (2006.01)

(52) U.S. Cl. ....................................................... 718/102
(58) Field of Classification Search .................. None
See application file for complete search history.

(56) References Cited

U.S. PATENT DOCUMENTS 6,711,616 B1   3/2004  Stamm et al.
6,944,862 B2   9/2005  Caggese et al.

FOREIGN PATENT DOCUMENTS

WO   WO 03005136 A2 *  1/2003

* cited by examiner

*Primary Examiner* — Jacob A Petranek
(74) *Attorney, Agent, or Firm* — Yee & Associates, P.C.; John D. Flynn

(57) ABSTRACT

A workload scheduler supporting the definition of a cumulative weighting index maintains a profile for each job. The profile defines an estimated usage of different resources of the system by the job. A tuning module imports the attributes of the jobs from the profile. The attributes of each job are rated according to an estimated duration of the job. The rated attributes so obtained are then combined, in order to define a single cumulative index for each job and a single cumulative index for each application.

2 Claims, 6 Drawing Sheets

WORKLOAD SCHEDULER WITH CUMULATIVE WEIGHTING INDEXES

This application is a continuation of application Ser. No. 10/876,026, filed Jun. 24, 2004, status allowed.

TECHNICAL FIELD

The present invention relates to the data processing field, and more specifically to a scheduling method.

BACKGROUND ART

Scheduling methods are commonly used in a data processing system to control submission of different work units (for example, jobs in a batch processing). For this purpose, several types of workload schedulers have been proposed in the last years to automate the submission of large quantities of jobs. An example of scheduler is the "Tivoli Workload Scheduler" by IBM Corporation.

A scheduler submits the jobs according to a predefined plan. The plan establishes a flow of execution of the jobs, which is based on their desired starting time and possible dependencies (for example, defined by the completion of predecessor jobs or by the availability of system resources).

A drawback of the schedulers known in the art is the lack of an efficient support for tuning the building of the plan. Typically, the plan is defined structuring the sequence of execution of the jobs according to their duration. For this purpose, most of the schedulers currently available automatically predict an estimated duration of each job; typically, the estimated duration of the job is calculated averaging the measured durations of instances of the job that have been executed previously.

However, this technique often leads to very poor results in terms of the overall performance of the system. Indeed, the duration of the jobs can depend on many factors that are completely unrelated from their characteristics (for example, a temporary unavailability of a required resource of the system). Moreover, the duration of the jobs is not indicative of their actual usage of the resources of the system.

As a consequence, the schedulers known in the art do not allow choosing the proper distribution of the jobs in the plan so as to optimize the consumption of the resources of the system. Moreover, no support is provided for balancing a workload of the system, in order to increase its overall performance.

An additional drawback is the lack of an efficient tool for simulating the impact of the plan on the system and for identifying possible bottlenecks (so as to avoid undesired delays in the executions of the jobs or service disruptions due to resource shortages). Moreover, no support is available for evaluating the effects of any change to the plan on the performance of the system, before the plan is actually submitted.

SUMMARY OF THE INVENTION

It is an object of the present invention to provide a measuring index allowing an immediate and significant comparison of the work units in the plan.

It is another object of the present invention to support an efficient tuning of the definition of the plan.

It is yet another object of the present invention to allow choosing the proper distribution of the work units in the plan so as to optimize the consumption of the resources of the system.

Moreover, it is an object of the present invention to provide a support for balancing a workload of the system, in order to increase its overall performance.

It is another object of the present invention to allow simulating the impact of the plan on the system for identifying possible bottlenecks.

It is yet another object of the present invention to avoid (or at least reduce) any delay in the executions of the work units or service disruptions due to resource shortages.

Particularly, it is an object of the present invention to provide the possibility of evaluating the effects of any change to the plan on the performance of the system (before the plan is actually submitted).

The accomplishment of these and other related objects is achieved by a method of scheduling submission of work units for execution on a data processing system, the method including the steps of: estimating a plurality of attributes for each work unit, each attribute being indicative of the usage of a corresponding resource of the system by the work unit, combining the attributes of each work unit into a single cumulative index, the index being indicative of a total usage of the resources of the system by the work unit, defining a plan of execution of the work units for optimizing the total usage of the resources of the system according to the corresponding cumulative indexes, and submitting the work units of the plan.

The present invention also provides a computer program for performing the method and a product embodying the program. A corresponding structure for implementing the method is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
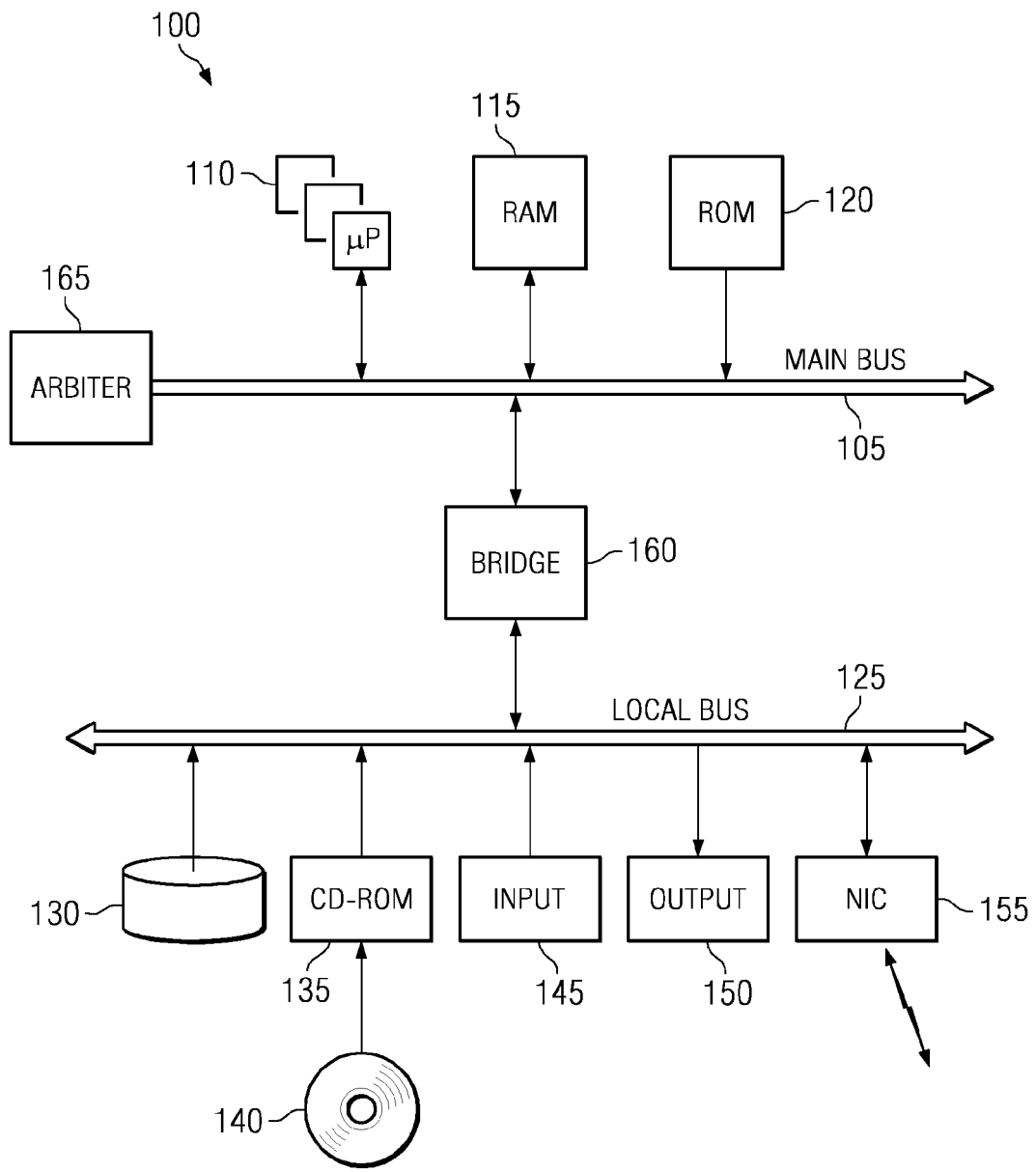
FIG. 1 is a schematic block diagram of a data processing system in which the method of the invention is applicable.

With reference in particular to FIG. 1, a schematic block diagram of a data processing system 100 (for example, a main frame) is shown. The system 100 is formed by several units, which are connected in parallel to a main bus 105. In detail, multiple microprocessors (µP) 110 control operation of the system 100; a RAM 115 (typically consisting of interleaved modules) is directly used as a shared working memory by the microprocessors 110, and a ROM 120 stores basic code for a bootstrap of the system 100. Several peripheral units are clustered around a local bus 125 (by means of respective interfaces). Particularly, a mass memory consists of one or more hard-disks 130 and drivers 135 for reading CD-ROMs 140. Moreover, the computer 100 includes input devices 145 (for example, a keyboard and a mouse), and output devices 150 (for example, a monitor and a printer). A network Interface Card (NIC) 155 is used to connect the system 100 to a network. A bridge unit 160 interfaces the main bus 105 with the local bus 125. Each microprocessor 110 and the bridge unit 160 can operate as master agents requesting an access to the main bus 105 for transmitting information. An arbiter 165 manages the granting of the access with mutual exclusion to the main bus 105.

Similar considerations apply if the system has a different structure (for example, with a single bus) or includes other units (for example, drivers for magnetic tapes). However, the concepts of the present invention are also applicable when the system consists of a mini-computer or when it is replaced with an equivalent structure (such as a network of workstations).

Figure 2:
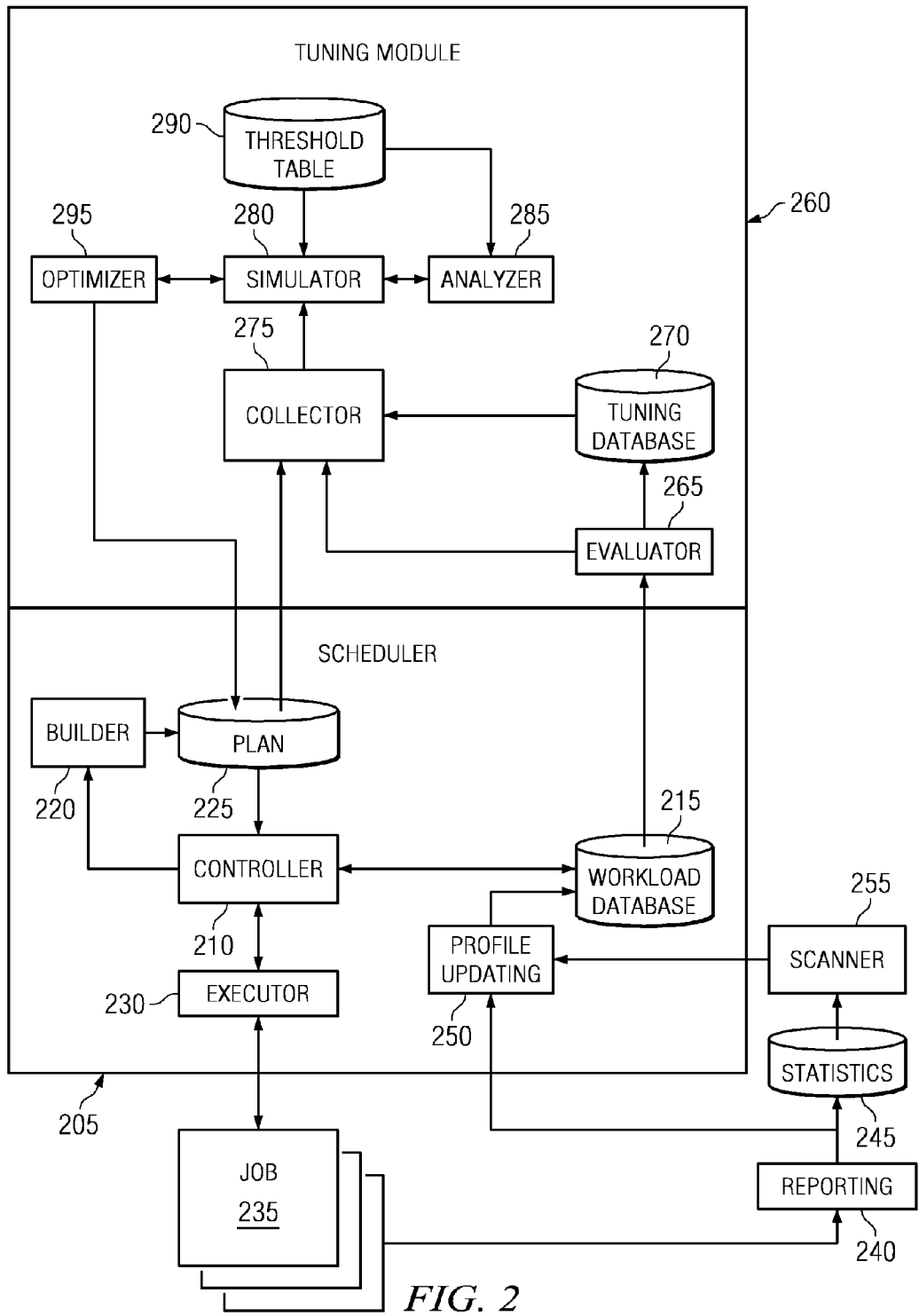
FIG. 2 depicts the main software components that can be used for practicing the method.
Figure 3A:
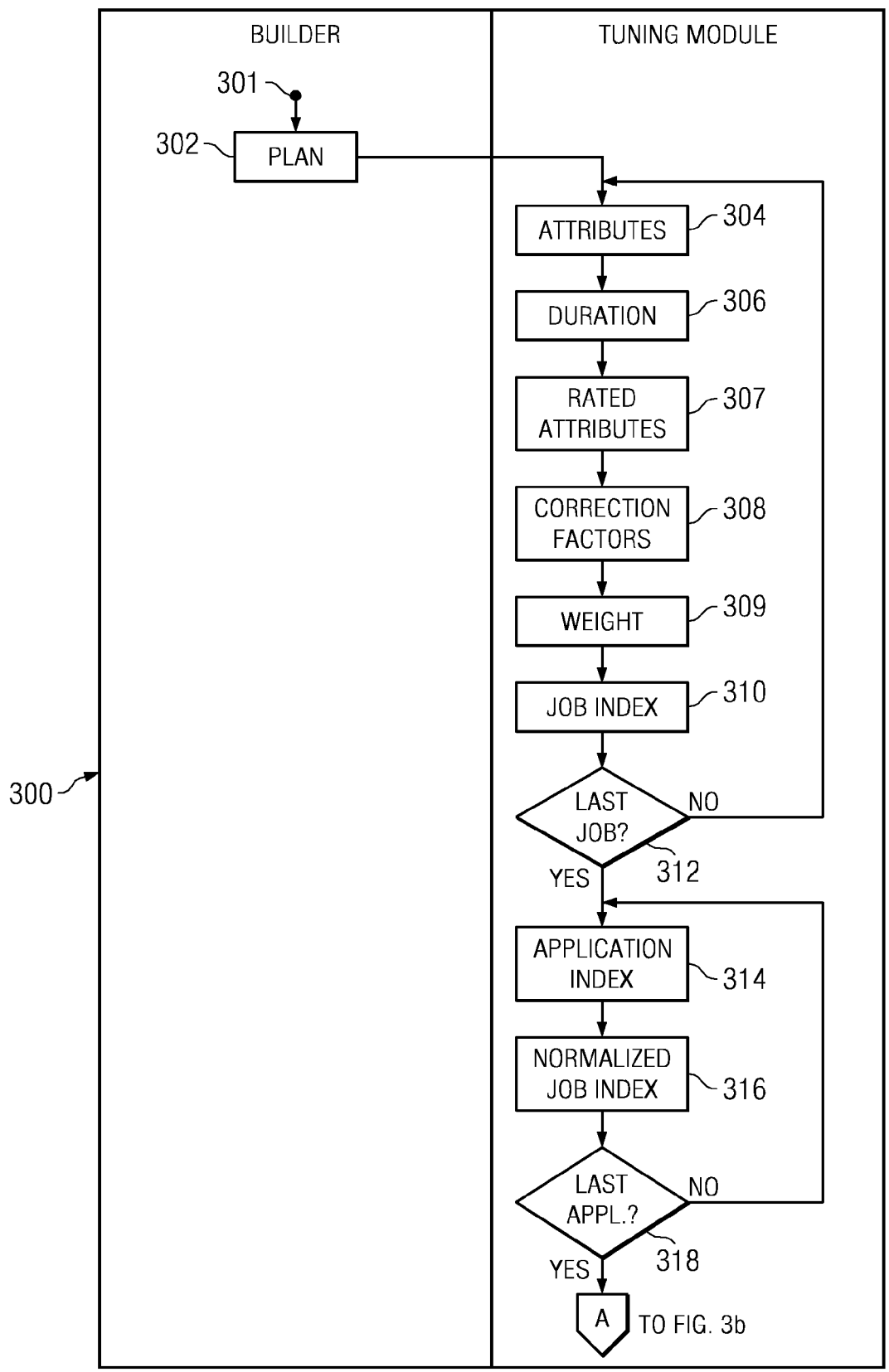
FIGS. 3a-3d show a diagram describing the flow of activities relating to an illustrative implementation of the method.
Figure 3B:
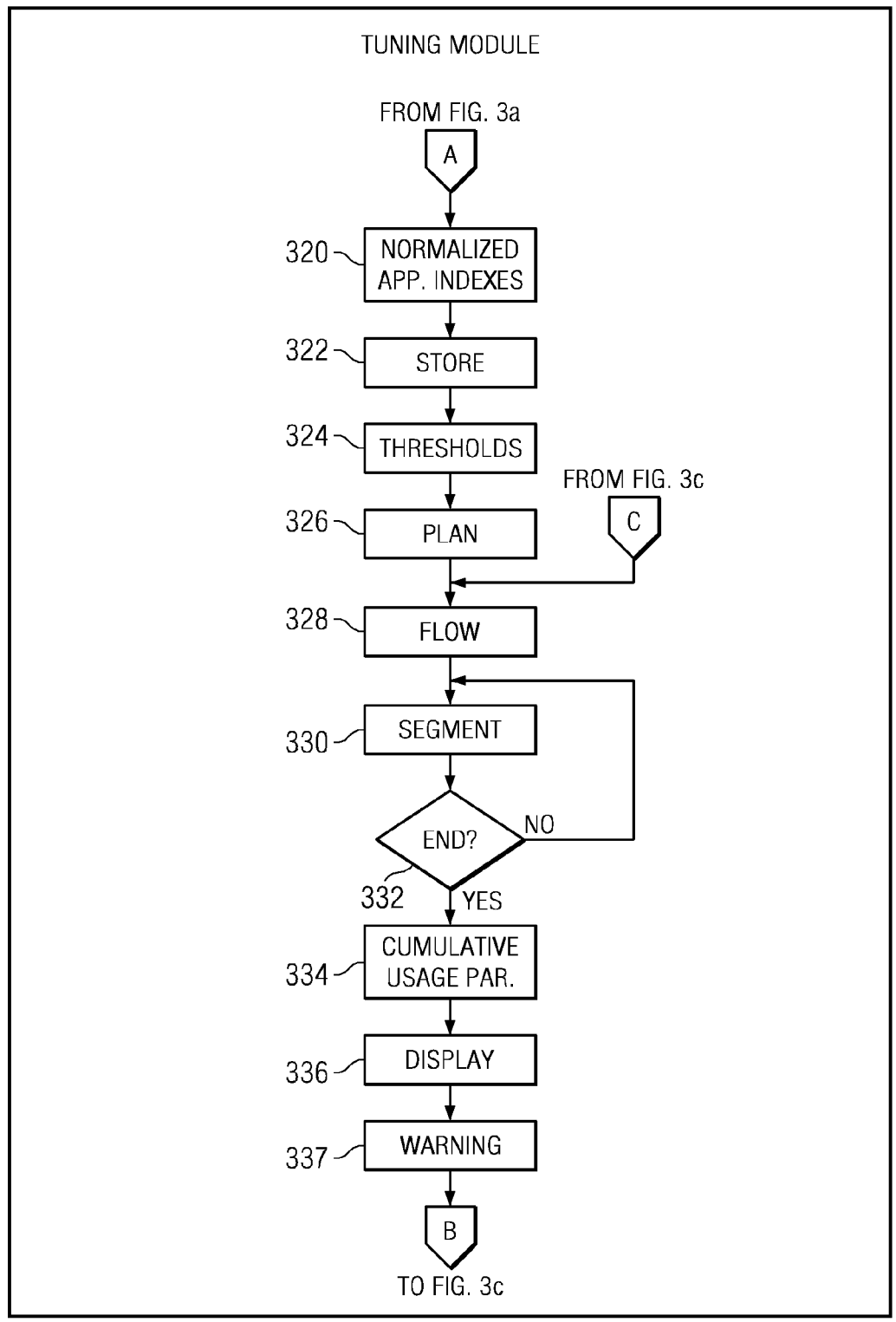
Figure 3C:
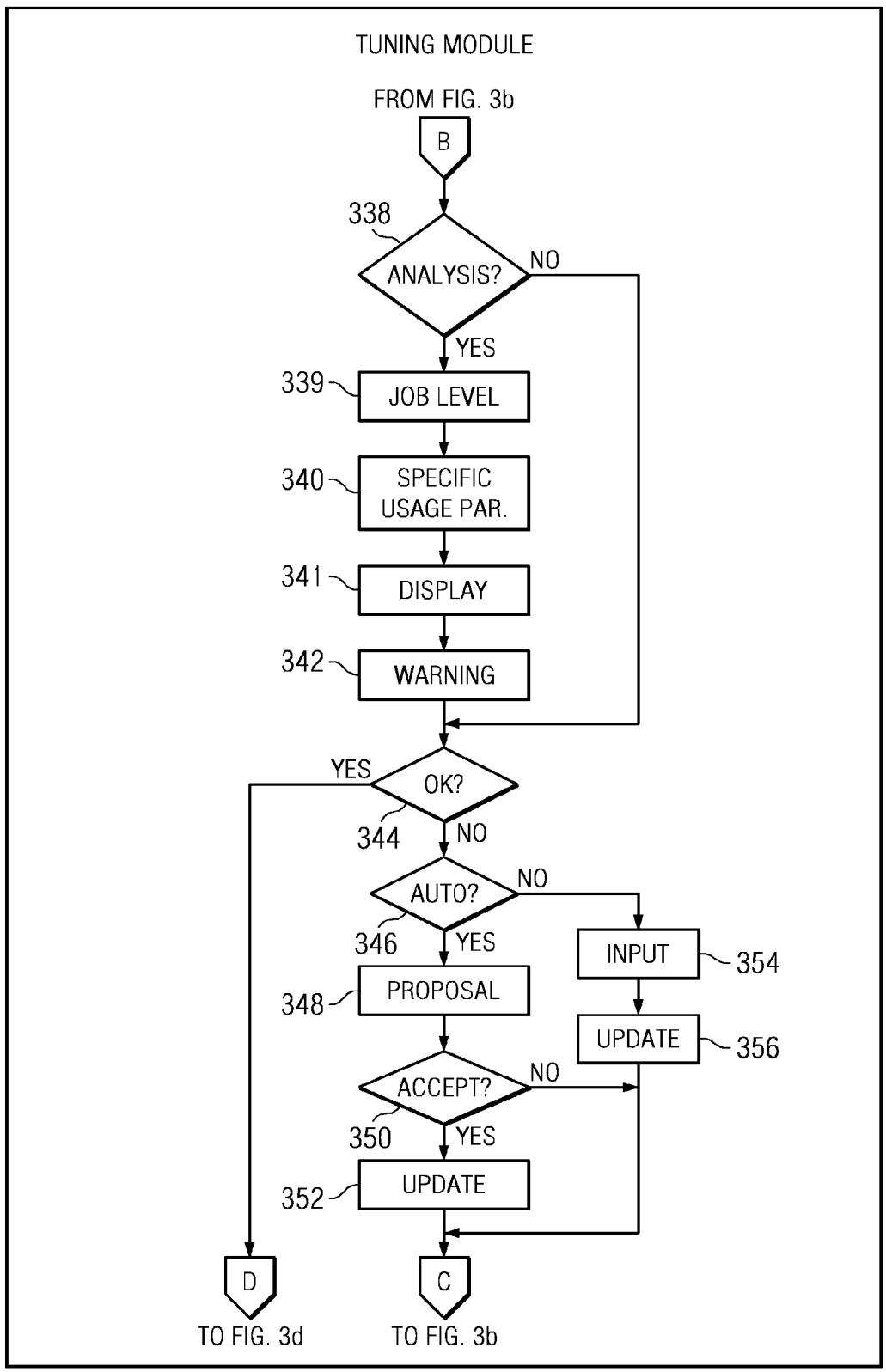
Figure 3D:
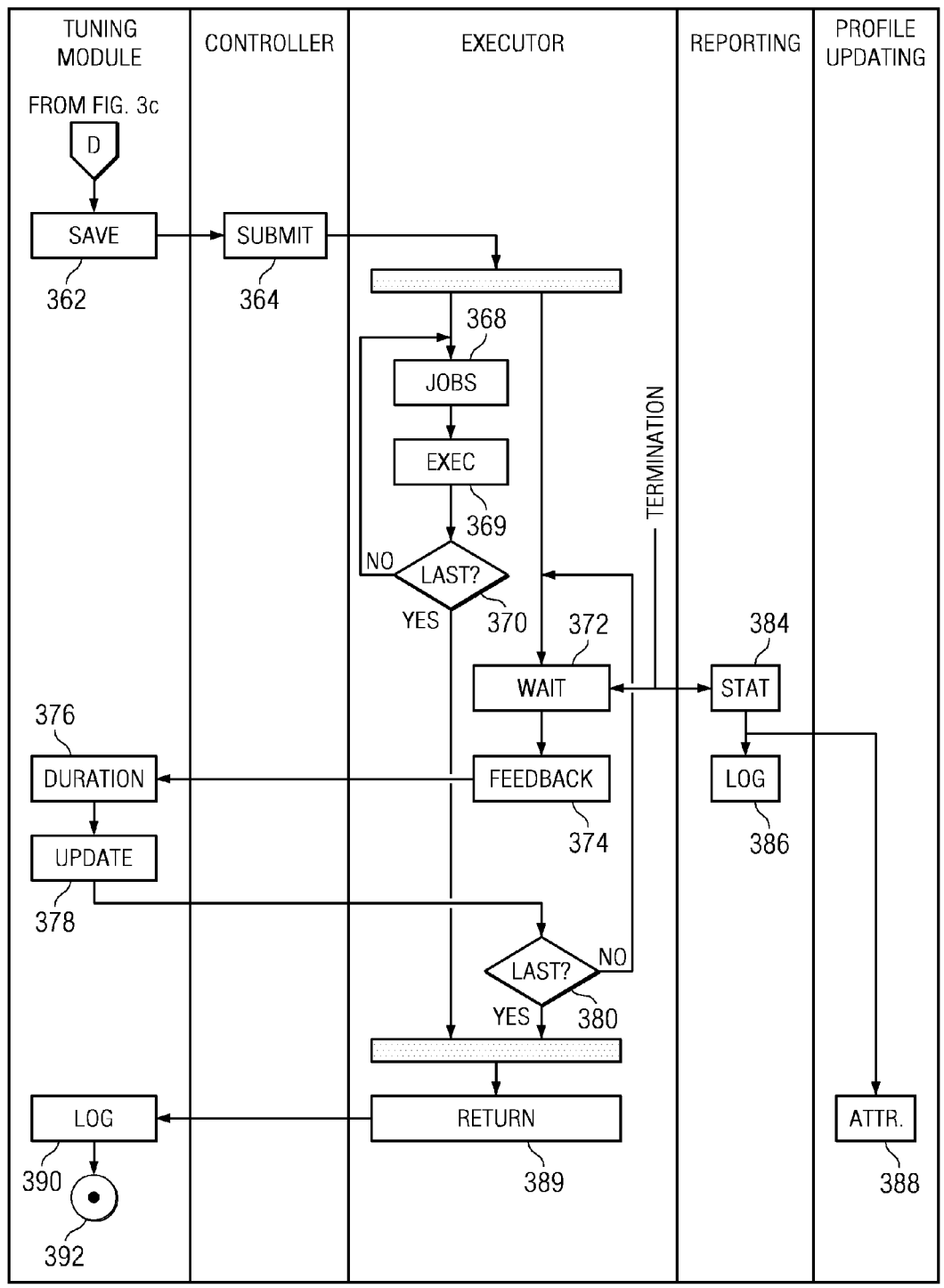

Moving to FIG. 2, the main software components that can be used to practice the method of the invention are depicted. The information (programs and data) is typically stored on the hard-disk and loaded (at least partially) into the working memory of the system when the programs are running, together with an operating system and other application programs (not shown in the figure). The programs are initially installed onto the hard disk from CD-ROM.

The above-described system is provided with a workload scheduler 205. The scheduler 205 includes a controller 210 for managing execution of a series of non-interactive jobs (typically during the evening); for example, the jobs consist of payroll programs, cost analysis applications, and the like. Typically, the jobs are organized into applications; an application is comprised of a set of related jobs, which flow of execution is specified within the application. The controller 210 accesses a workload database 215 that stores information about the different jobs to be executed. For each job, the workload database 215 includes a description of the corresponding steps, a planned time of execution, and any dependency from other jobs or resources of the system; moreover, the workload database 215 stores a record indicating an estimated duration of the job.

A profile is also associated with each job in the workload database 215 (or at least with the ones that are run regularly). The profile includes multiple attributes of the job; each attribute is indicative of an estimated usage of a corresponding resource of the system, which is likely to be required by the job during its execution. For example, the attributes represent the processing power usage (expressed in seconds), the memory space occupation, the service unit consumption (defined as an intelligent mix of various factors), the number of tape mounts, the input/output activity (expressed in number of operations), the amount of printed pages, and the like.

The controller 210 transmits the description of each job to be executed (stored in the workload database 210) to a builder 220. The builder 220 creates one or more plans for controlling a flow of execution of batches of jobs in a desired sequence (for example, covering a period of 24 hours). Each plan is built according to several factors; typically, the factors affecting the flow of execution include temporal values (such as date, time, day of the week) and dependencies (such as completion of predecessor jobs or system resource availability). The plans are stored into a corresponding repository 225. A selected plan from the repository 225 is supplied, through the controller 210, to an executor 230. The executor 230 submits the jobs of the plan in a production environment and controls their running.

Once the current instance of a generic job (denoted with 235) terminates its execution, because all the operations have been completed or an error has occurred, feedback information is returned to the controller 210 via the executor 230; the feedback information includes an actual start time and an actual end time of the terminated instance of the job, a return code specifying the result of the operations, and the like. The controller 210 uses this information to calculate the duration of the terminated job, in order to predict how long the job should run in the future; the corresponding record indicating the estimated duration of the job is updated accordingly in the workload database 215.

At the same time, a reporting module 240 collects statistics about the terminated job 235; for example, the statistics include different metric values relating to the terminated job (such as the microprocessor seconds being used, the bytes of memory space being occupied, the number of service units being consumed, the number of tape mounts being performed, the number of input/output operations being executed, and the amount of pages being printed). The information collected by the reporting module 240 is logged into a job statistics database 245. A profile updating module 250 captures the statistics of the terminated job (before they are written to the database 245). The module 250 uses these statistics to update the corresponding profile of the job in the workload database 215. In addition or in alternative, a batch scanner 255 periodically imports all the statistics (of the instances of the jobs that have been previously executed) from the database 245. The profile updating module 250 uses these statistics for performing a bulk update of the profiles in the workload database 215 on a regular basis (for example, every day).

A tuning module 260 is added to the scheduler 205. The tuning module 260 includes an evaluator 265, which accesses the workload database 215. As described in detail in the following, the evaluator 265 combines the attributes of the jobs in a selected plan to obtain information about an estimated usage of the resources of the system. The information so obtained (together with any parameter used for its definition) is stored into a tuning database 270.

A collector 275 accesses the plan repository 225 and the tuning database 270. Moreover, the collector 275 can receive the resource usage information for a selected plan from the evaluator 265 directly. The collector 275 transmits the information so obtained to a simulator 280. The simulator 280 helps an administrator evaluate the impact of the plan on the performance of the system. The simulator 280 exploits an analyzer 285, which is used to break down the plan according to different factors (such as the applications defined in the plan, the jobs included in each application, or a selected resource of the system). Both the simulator 280 and the analyzer 285 can warn the administrator of the exceeding of different threshold values, which are stored in a table 290. Particularly, the table 290 includes a cumulative threshold indicating a maximum allowable total usage of the resources of the system, and a set of specific thresholds each one indicating a maximum allowable consumption of a corresponding resource.

The simulator 280 interfaces with an optimizer 295. The optimizer 295 is used to identify changes to the plan (either manually or automatically), in order to improve the whole performance of the system; the optimizer 295 updates the plan in the corresponding repository 225 according to the changes selected by the administrator.

Similar considerations apply if the programs and the corresponding data are structured in another way, if different modules or functions are supported, or if the programs are provided on an equivalent computer readable medium (such as a DVD). Alternatively, the plans are defined in a different way, the profiles of the jobs include other information, or the statistics are collected in a different way (for example, they are extracted from an external database). Moreover, the attributes can be expressed with equivalent values, a different number of attributes can be taken into account, or attributes indicative of the usage of other resources can be envisaged (for example, relating to a network traffic, a number of page faults, and the like). In any case, the invention is also suitable to be used for scheduling submission of different jobs, interactive tasks, or more generally any other work units.

With reference now to FIGS. 3a-3d, the scheduler (when running on the system) performs a method 300 that begins at the black start circle 301 in the swim-lane of the builder. Continuing to block 302, a new plan is created (or an existing plan is updated) specifying the flow of execution of the desired jobs.

The method then passes to block 304 in the swim-lane of the tuning module. For each job of the plan, starting from the first one, the evaluator extracts its attributes from the respective profile (with each attribute that is denoted $A_{ij}$, where i=1...6 in the example mentioned above and j=1...N, N being the number of jobs in the plan). Likewise, the estimated duration of the job (denoted with $D_j$) is retrieved from the corresponding record in the workload database at block 306. Proceeding to block 307, the evaluator calculates a series of rated attributes $RA_{ij}$ dividing the corresponding attributes $A_{ij}$ by the estimated duration $D_j$ of the job:

$$RA_{ij}=A_{ij}/D_j$$

The rated attributes $RA_{ij}$ represent the distribution of the usage of the corresponding resources of the system by the different jobs. For example, let us consider a first job and a second job both consuming 10 s of processing power; the first job lasts 20 s and the second job lasts 200 s. In this case, the corresponding rated attribute for the first job (10/20=0.5) is far higher than the one for the second job (10/200=0.05); indeed, the first job is more (processing) intensive than the second job since the usage of the processing power is concentrated in a short period (instead of being distributed over a relatively long period).

Continuing to block 308, a set of correction factors $F_i$ is retrieved from the tuning database. Each correction factor $F_i$ represents the weight of the corresponding resource with respect to the whole performance of the system. Typically, the correction factor associated with the processing power usage has a high value, the correction factors associated with the memory space occupation and the service units consumption have medium values, whereas the correction factors associated with the number of tape mounts, the input/output operations and the amount of printed pages have low values; these choices take into account the fact that the processing power is the heaviest constraint for the operation of the system, with the consumption of the other resources that has a decreasing impact thereon. Moreover, the correction factors $F_i$ allow combining the different measuring units used for the corresponding rated attributes correctly. In this phase, the administrator can also update one or more correction factors $F_i$ dynamically. Typically, the correction factors $F_i$ are customized according to temporary needs or to system resource availability; for example, the correction factor associated with the amount of printed pages is increased when some printers are not available or is decreased when new printers are added.

The method continues to block 309, wherein the rated attributes $RA_{ij}$ are weighted according to the corresponding correction factors $F_i$. Descending into block 310, a cumulative index $I_j$ of the job is calculated summing all the rated attributes $RA_{ij}$ so weighted:

$$I_j=\Sigma(F_i \cdot RA_{ij})$$

A test is made at block 312 to determine whether the last job of the plan has been processed. If not, the method returns to block 304 for calculating the cumulative index $I_j$ of a next job. Conversely, a further loop is entered at block 314; for each application defined in the plan, starting from the first one, the evaluator calculates a single cumulative index $AI_k$ (where k=1...M, M being the number of applications in the plan) by summing the indexes $I_j$ of the corresponding jobs:

$$AI_k=\Sigma I_j$$

Continuing to block 316, a normalized job index $NI_j$ is calculated for each job of the application:

$$NI_j=I_j/AI_k$$

The evaluator verifies at block 318 whether the last application of the plan has been processed. If not, the method returns to block 314 for repeating the operations described above for a next application. Conversely, the flow of activity passes to block 320 wherein a normalized application index $NAI_k$ is calculated for each application of the plan (according to the total value of the application indexes $AI_k$):

$$NAI_k=AI_k/\Sigma AI_k$$

The job indexes $I_j$ and the application indexes $AI_k$ provide an immediate indication of the total usage of all the (relevant) resources of the system by the jobs and the applications, respectively. In other words, those indexes give an immediate and very complete picture of the impact of the jobs/applications on the performance of the system. The normalized job indexes $NI_j$ and the normalized application indexes $NAI_k$ are comparable values that can be correlated to identify the weight of the jobs or of the applications, respectively, in terms of their impact on the operation of the system.

With reference now to block 322, all the values calculated in the above-described steps (rated attributes $RA_{ij}$, job indexes $I_j$, application indexes $AI_k$, normalized job indexes $I_j$ and normalized application indexes $AI_k$) are stored into the corresponding database for a possible future use.

The method then continues to block 324, wherein the simulator retrieves the cumulative threshold (for the total usage of the resources of the system) and each specific threshold (for the usage of the corresponding resources) from the respective table. Proceeding to block 326, the collector retrieves and passes the definition of the plan to the simulator. With reference now to block 328, the simulator determines the estimated flow of execution of the jobs in the plan; for this purpose, each job is supposed to start at its planned time (as soon as all the corresponding conditions are met) and is supposed to end after its estimated duration. The method then enters a loop for partitioning the plan into different segments; particularly, a new segment is identified at block 330 (starting from the beginning of the plan) whenever a job is started or ended (according to the estimated flow of the plan). A test is made at block 332 to determine whether a conclusion of the plan has been reached. If not, the method returns to block 330 to identify a next segment.

Conversely, the flow of activity descends into block 334 wherein for each segment the simulator calculates a parameter indicating a cumulative usage of all the (relevant) resources of the system; for this purpose, the application indexes $AI_k$ of the applications running in that segment are summed. A graphic presenting the impact of the plan on the performance of the system is then displayed at block 336. In detail, the plan is shown as a bar diagram. Each bar represents a segment of the plan (with a length proportional to its duration). The bar has a height proportional to the corresponding cumulative usage parameter; the bar is split into strips denoting the contributions of the different applications running in the segment to the cumulative usage parameter (according to their normalized indexes $NAI_k$). Moving to block 337, the graphic also includes a line representing the cumulative threshold; each segment for which the cumulative usage parameter exceeds the cumulative threshold is highlighted (so as to warn the administrator of a potentially dangerous condition).

The method then enters decision block 338. If the administrator wishes to analyze the plan further, the blocks 339-342 are executed and the method passes to block 344; conversely, the flow of activity descends into block 344 directly.

With reference in particular to block 339 (analysis), the administrator can decide to break down the representation of the plan at a job level. For this purpose, the representation of a selected application is expanded (for example, with a pie diagram) so as to show the contribution of the different jobs to the respective application index $AI_k$ (according to their normalized indexes $NI_j$). Continuing to block 340, the administrator can also choose to investigate the weight of the plan at a resource detail. In this case, for each segment the simulator calculates a further parameter indicating a usage of a selected resource of the system; for this purpose, the corresponding rated attributes $RA_{ij}$ of the jobs running in that segment are summed. A further bar diagram presenting the impact of the plan on the usage of the selected resource is then displayed at block 341. In this case, each bar has a height proportional to the corresponding specific usage parameter; the bar is split into strips denoting the contributions of the different jobs running in the segment to the specific usage parameter (according to their rated attributes $RA_{ij}$). Moving to block 342, the graphic also includes a line representing the corresponding specific threshold; each segment which specific usage parameter exceeds the specific threshold is highlighted to warn the administrator.

In this way, the administrator can readily identify any massive overloading of the system (either on the whole or with reference to a specific resource). The administrator can then identify any critical time frame and investigate the corresponding resource shortage. An additional function can also be provided to show the exceeded thresholds only (according to the selected view).

Considering now block 344, a test is made to determine whether the plan is accepted in its current form. If not, the method branches at block 346 according to the configuration of the optimizer. If the optimizer works in an automatic mode, the blocks 348-352 are executed, whereas if the optimizer works in a manual mode the blocks 354-356 are executed. In both cases, the method then returns to block 328 to display the effects of any change to the plan on the performance of the system.

When the optimizer works in the automatic mode, adjustments to the plan are proposed to the administrator at block 348. For example, some jobs are moved from an application to another, the starting times of the applications and/or of the jobs are updated, and the like. The administrator is then prompted to accept the proposed adjustments at decision block 350. If so, the plan is updated at block 352 accordingly, and the method returns to block 328; conversely, the flow of activity passes to block 328 directly.

On the other hand, when the optimizer works in the manual mode (decision block 346), the administrator inputs any desired adjustment to the plan at block 354. The plan is then updated at block 356, and the method returns to block 328.

Referring back to block 344, as soon as the administrator accepts the plan its definition is stored into the corresponding repository at block 362 (if desired). The plan can now be submitted for execution by the controller at block 364. The swim-lane of the executor includes two branches that run concurrently. A first branch consists of blocks 368-370, and a second branch consists of blocks 372-388; the two branches joint at block 389.

Considering in particular the branch 368-370, the executor at block 368 identifies the jobs that are available for running (according to their planned time of execution and their dependencies). The available jobs are submitted for execution at block 369. The executor then verifies at block 370 whether all the jobs of the plan have been submitted. If not, the flow of activity returns to block 368 for repeating the operations described above on the jobs of the plan still to be submitted. Conversely, the execution of the branch ends at block 389.

At the same time, in the other branch 372-388 the executor is in a waiting condition at block 372. As soon as a generic job terminates its execution, the corresponding feedback information is returned to the controller at block 374. In response thereto, the controller at block 376 calculates the duration of the terminated job by subtracting its start time from its end time. Continuing to block 378, the controller uses the value so calculated to update the estimated duration of the job; for example, the estimated duration is determined as a running average of the values that have been measured for the completed instances of the job (preferably filtering very different values as anomalies).

Returning to the swim-lane of the executor, a test is made at block 380 to determine whether all the jobs of the plan have been terminated. If not, the flow of activity returns to block 372 waiting for the termination of a further job. Conversely, the execution of the branch ends at block 389.

Concurrently, the termination of the job also triggers the collection of the corresponding statistics by the reporting module at block 384. Proceeding to block 386, the collected information is logged into the job statistics database. The statistics are also captured by the profile updating module at block 388 (in the respective swim-lane). These statistics are then used to change the profile of the job. For example, each attribute of the job is updated to a corresponding running average of the values that have been measured for the completed instances of the job; preferably, the profile updating module can be tuned with user-adjustable parameters that define a smoothing factor and an anomaly identifying limit (so as to discard very different values).

Referring back to the swim-lane of the executor, once the above-described branches have joined at block 389 the flow of activity returns to the controller. In response thereto, the controller at block 390 logs a result of the execution of the plan. The process then ends at the concentric white/black stop circles 392.

Similar considerations apply if an equivalent method is performed, or if some functions are executed by different modules. In any case, the concepts of the present invention are also applicable when the indexes are expressed in a different way, or when the simulator supports equivalent graphic representations of the plan. Alternatively, the plan can be analyzed breaking down its evaluation at other levels and/or details (for example, only working at the job level or allowing the analysis of the usage of different categories of a specific resource). Additional features are feasible for automatically selecting optimized options for the plan (without any manual intervention), for periodically updating the resource usage database in the background, or for importing production information into a test environment.

More generally, the present invention proposes a method of scheduling submission of work units for execution on a data processing system. The method starts with the step of estimating a plurality of attributes for each work unit; each attribute is indicative of the usage of a corresponding resource of the system by the work unit. The attributes of each work unit are combined into a single cumulative index; the index is indicative of a total usage of the resources of the system by the work unit. The method continues defining a plan of execution of the work units for optimizing the total usage of the resources of the system according to the corresponding cumulative indexes. The method ends with the step of submitting the work units of the plan.

The solution of the invention provides a measuring index, which allows an immediate and significant comparison of the work units in a plan.

The proposed feature supports an efficient tuning of the definition of the plan.

In this way, it is possible to choose the proper distribution of the work units in the plan (so as to optimize the consumption of the resources of the system).

The devised method offers a valid support for balancing a workload of the system, in order to increase its overall performance.

The proposed technique can also be used for simulating the impact of the plan on the system and for identifying possible bottlenecks.

This solution allows avoiding (or at least reducing) any delay in the executions of the work units or any service disruptions due to resource shortages.

The method of the invention also provides the possibility of evaluating the effects of any change to the plan on the performance of the system (before the plan is actually submitted).

The preferred embodiment of the invention described above offers further advantages.

Particularly, the job indexes are calculated according to the corresponding rated attributes.

This choice provides a significant indication of the distribution of the usage of the resources.

A suggested algorithm for calculating the job indexes involves the weighing of the rated attributes according to the correction factors.

The proposed solution takes into account the different impact of the resources on the whole performance of the system.

As a further improvement, the correction factors are updated dynamically.

In this way, the administrator can tune the plan according to contingent needs.

Advantageously, the attributes and the duration of each job are estimated averaging corresponding metric values measured for the previous instances of the job.

This method is quite simple but at the same time provides very reliable results.

In any case, the solution according to the present invention leads itself to be implemented combining the attributes of each job in a different way (for obtaining the corresponding cumulative index), without the possibility of updating the correction factors dynamically, or with other methods for estimating the attributes and the duration of the jobs. For example, the tuning module exploits automatic learning algorithms, the correction factors are automatically set according to runtime characteristics of the system, and the like.

A way to improve the proposed solution is that of verifying whether the total usage parameter (i.e., the sum of the cumulative indexes of the jobs executed concurrently) exceeds the cumulative threshold.

In this way, the administrator can be warned of any potentially dangerous condition.

As a further enhancement, the same verification is supported for any selected resource of the system.

This feature helps the administrator identify the actual cause of any bottleneck.

Alternatively, different thresholds are verified, or the tuning module works at another level of detail. In any case, the proposed solution is also suitable to be implemented without the verification of any threshold (for either all the resources and/or selected resources).

Advantageously, the solution according to the present invention is implemented with a computer program, which is provided as a corresponding product embodied in a suitable medium.

Alternatively, the program is pre-loaded onto the hard-disk, is sent to the computer through a network (typically the INTERNET), is broadcast, or more generally is provided in any other form directly loadable into a working memory of the system. However, the method according to the present invention leads itself to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A computer program product comprising:
a non-transitory computer recordable medium storing computer usable program code for scheduling submission of work units for execution on a data processing system, the computer program product comprising:
first instructions for estimating a plurality of attributes for each work unit of a plurality of work units, each attribute of a work unit being indicative of a usage of a corresponding resource of the system by the work unit, wherein the plurality of attributes comprises a plurality of an attribute that represents processing power usage, an attribute that represents memory space occupation, an attribute that represents service unit consumption, an attribute that represents a number of tape mounts, an attribute that represents a number of input/output operations being executed, and an attribute that represents an amount of pages being printed;
second instructions for combining the plurality of attributes of each work unit into a cumulative index, wherein the cumulative index is indicative of a total usage of resources of the system by the work unit, wherein the second instructions comprises:
instructions for estimating a time duration of the work unit;
instructions for dividing each of the plurality of attributes of the work unit by the estimated time duration of the work unit to form a plurality of rated attributes, wherein the plurality of rated attributes represent a distribution of the usage of the corresponding resource of the system by the work unit; and
instructions for calculating the cumulative index according to the plurality of rated attributes, wherein the instructions for calculating the cumulative index according to the plurality of rated attributes, comprises:
instructions for weighting each of the plurality of rated attributes according to a correction factor associated with the corresponding resource of the system, wherein the correction factor is retrieved from a tuning database that dynamically updates the correction factor; and
instructions for summing the weighted attributes;

third instructions for defining a plan of execution of the plurality of work units for optimizing a total usage of the resources of the system according to cumulative indexes of the plurality of work units;

fourth instructions for verifying whether a sum of the cumulative indexes of work units of the plurality of work units to be executed concurrently according to the plan exceeds a first threshold value;

fifth instructions for verifying for at least one selected resource of the resources of the system, whether a sum of the rated attributes of the work units to be executed concurrently according to the plan exceeds a second threshold value; and sixth instructions for submitting the plurality of work units of the plan to an administrator.

2. A structure for scheduling submission of work units for execution on a data processing system, the structure comprising:

means for estimating a plurality of attributes for each work unit of a plurality of work units, each attribute being indicative of a usage of a corresponding resource of the system by the work unit, wherein the plurality of attributes comprises a plurality of an attribute that represents processing power usage, an attribute that represents memory space occupation, an attribute that represents service unit consumption, an attribute that represents a number of tape mounts, an attribute that represents a number of input/output operations being executed, and an attribute that represents an amount of pages being printed;

means for combining the plurality of attributes of each work unit into a cumulative index, wherein the cumulative index is indicative of a total usage of resources of the system by the work unit, wherein the combining means comprises:

means for estimating a time duration of the work unit;

means for dividing each of the plurality of attributes of the work unit by the estimated time duration of the work unit to form a plurality of rated attributes, wherein the plurality of rated attributes represent a distribution of the usage of the corresponding resource of the system by the work unit; and means for calculating the cumulative index according to the plurality of rated attributes, wherein the calculating the means comprises:

means for weighting each of the plurality of rated attributes according to a correction factor associated with the corresponding resource of the system, wherein the correction factor is retrieved from a tuning database that dynamically updates the correction factor; and means for summing the weighted attributes;

means for defining a plan of execution of the plurality of work units for optimizing a total usage of the resources of the system according to cumulative indexes of the plurality of work units;

first verifying means for verifying whether a sum of the cumulative indexes of work units of the plurality of work units to be executed concurrently according to the plan exceeds a first threshold value;

second verifying means for verifying for at least one selected resource of the resources of the system, whether a sum of the rated attributes of the work units to be executed concurrently according to the plan exceeds a second threshold value; and means for submitting the plurality of work units of the plan to an administrator.

* * * * *